United States Patent
Kato

(10) Patent No.: US 11,933,907 B2
(45) Date of Patent: Mar. 19, 2024

(54) DIRECTION DETECTION DEVICE, METHOD OF ACQUIRING INTENSITY DIFFERENCE TABLE, DIRECTION DETECTION METHOD, AND COMPUTER-READABLE STORAGE MEDIUM

(71) Applicant: MITSUBISHI HEAVY INDUSTRIES, LTD., Tokyo (JP)

(72) Inventor: Noriyasu Kato, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 109 days.

(21) Appl. No.: 17/693,709

(22) Filed: Mar. 14, 2022

(65) Prior Publication Data
US 2022/0334210 A1 Oct. 20, 2022

(30) Foreign Application Priority Data
Apr. 20, 2021 (JP) ................. 2021-071231

(51) Int. Cl.
*G01S 3/28* (2006.01)
*G01S 3/04* (2006.01)

(52) U.S. Cl.
CPC ............... *G01S 3/28* (2013.01); *G01S 3/043* (2013.01)

(58) Field of Classification Search
CPC .................................. G01S 3/28; G01S 3/043
USPC ............... 342/445, 352, 174, 386, 458, 377
See application file for complete search history.

(56) References Cited

U.S. PATENT DOCUMENTS

2018/0038935 A1\* 2/2018 Iizuka ...................... G01S 5/02

FOREIGN PATENT DOCUMENTS

| CN | 106932750 | 7/2017 |
|---|---|---|
| CN | 107656238 | 2/2018 |
| GB | 2 314 716 | 7/1998 |
| JP | 3-25386 | 2/1991 |
| JP | 2010-133907 | 6/2010 |

OTHER PUBLICATIONS

Office Action dated Sep. 1, 2022 in corresponding United Kingdom Patent Application No. GB2203419.3.

\* cited by examiner

*Primary Examiner* — Bo Fan
(74) *Attorney, Agent, or Firm* — WENDEROTH, LIND & PONACK, L.L.P.

(57) ABSTRACT

A direction detection device for detecting a received-wave arrival direction of a received wave, and includes: antennas for receiving the received wave; an intensity difference imparting unit that imparts intensity differences different depending on the received-wave arrival direction to intensities of the received wave; a storage unit that stores an intensity difference table in which the intensity difference between two of the antennas is associated with the received-wave arrival direction, for each combination of any two of the antennas; a detector that detects the intensity difference between the two antennas of the received wave; an extractor that extracts, from the intensity difference table, received-wave arrival directions corresponding to the intensity difference detected by the detector, for each combination; and a comparator that compares the received-wave arrival directions extracted by the extractor between the combinations of the antennas to acquire a matched received-wave arrival direction as a detection result.

10 Claims, 11 Drawing Sheets

A-A

B-B

DIRECTION DETECTION DEVICE, METHOD OF ACQUIRING INTENSITY DIFFERENCE TABLE, DIRECTION DETECTION METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2021-071231 filed in Japan on Apr. 20, 2021.

FIELD

The present disclosure relates to a direction detection device for detecting a received-wave arrival direction, a method of acquiring an intensity difference table, a direction detection method, and a computer-readable storage medium.

BACKGROUND

Conventionally, as direction detection devices, angle measurement processing devices have been known that calculate the arrival direction of signals of received wave or the like (refer to Japanese Patent Application Laid-open No. 2010-133907, for example). The angle measurement processing device includes a plurality of antenna elements and a radome that covers the antenna elements. The angle measurement processing device calculates an arrival direction of an incoming signal using the incoming signals received by the antenna elements.

However, when the received-wave arrival direction is detected using a phase difference between a plurality of antennas, ambiguity may occur. Ambiguity is a phenomenon that a plurality of candidates for the received-wave arrival direction are calculated in accordance with a relation between a distance between the antennas, and a wavelength of the received wave, even if the phase difference acquired between the antennas is the same. The ambiguity that occurs changes according to the distance between the antennas. Thus, in order to eliminate the ambiguity, it is common to use the a plurality of the antennas in which the distances between the antennas are unequal.

When a plurality of the antennas are lined up in one direction (for example, in the azimuth direction (also known as AZ direction)), the antennas can detect the received-wave arrival, direction in a plane (two-dimensional) that includes one direction. Thus, in order to detect a three-dimensional received-wave arrival direction, it is necessary to line up the antennas in one direction and also line up in another direction that intersects the one direction (for example, in an elevation angle direction (also known as EL direction)), that is, it is necessary to array the antennas in a two-dimensional manner.

However, the antennas installed in the inner space of the radome may be difficult to be arrayed in a two-dimensional manner due to spatial restrictions of the radome, in some cases. When the antennas are lined up in only one dimensional direction due to the spatial restrictions of the radome, the received-wave arrival direction in the plane including that direction can be calculated from the phase difference between the antennas, but in the other direction intersecting the one direction, the received-wave arrival direction cannot be calculated using the phase difference because there are no plurality of the antennas.

Thus, the present disclosure addresses the problem of providing a direction detection device, a method of acquiring an intensity difference table, a direction detection method, and a computer-readable storage medium that can detect the received-wave arrival direction in a suitable manner while removing ambiguity, even if there are restrictions on the installation of antennas in the radome.

SUMMARY OF THE INVENTION

A direction detection device according to one aspect of the present disclosure is for detecting a received-wave arrival direction of a received wave. The direction detection device includes: a plurality of antennas for receiving the received wave; an intensity difference imparting unit that imparts intensity differences different depending on the received-wave arrival direction to intensities of the received wave to be received at the antennas; a storage unit that stores an intensity difference table in which the intensity difference between two of the antennas is associated with the received-wave arrival direction, for each combination of any two of the antennas; a detector that detects the intensity difference between the two antennas of the received wave to be received at the antennas; an extractor that extracts, from the intensity difference table stored in the storage unit, a plurality of received-wave arrival directions corresponding to the intensity difference detected by the detector, for each combination of any two of the antennas; and a comparator that compares the received-wave arrival directions extracted by the extractor between the combinations of the antennas to acquire a matched received-wave arrival direction as a detection result.

A method according to another aspect of the present disclosure is of acquiring the intensity difference table used in the direction detection device described above. The method includes: setting up a radio wave source for generating the received wave so that the received wave is in a predetermined arrival direction with respect to the plurality of antennas; causing the radio wave source to generate the received wave; receiving the received wave by the antennas; and acquiring the intensity difference table in which an intensity difference of the received wave between two of the antennas is associated with a received-wave arrival direction.

A direction detection method according to still another aspect of the present disclosure is of detecting a received-wave arrival direction of a received wave by the direction detection device described above. The direction detection method includes: receiving the received wave by the plurality of antennas; detecting, by the detector, an intensity difference between two of the antennas of the received wave to be received at the antennas; extracting, by the extractor, from the intensity difference table stored in the storage unit, a plurality of received-wave arrival directions corresponding to the intensity difference detected by the detector, for each combination of any two of the antennas; and comparing, by the comparator, the received-wave arrival directions extracted between the combinations of the antennas to acquire a matched received-wave arrival direction as a detection result.

A non-transitory computer-readable storage medium according to yet another aspect of the present disclosure stores a direction detection program for detecting a received-wave arrival direction of a received wave. The direction detection program, when executed by a computer of the direction detection device described above, causes the direction detection device to: receive the received wave by the plurality of antennas; detect an intensity difference between two of the antennas of the received wave to be received at the antennas; extract, from the intensity difference table stored in the storage unit, a plurality of received-wave arrival directions corresponding to the detected intensity difference, for each combination of any two of the antennas; and compare the received-wave arrival directions extracted between the combinations of the antennas to acquire a matched received-wave arrival direction as a detection result.

Advantageous Effects of Invention

According to the present disclosure, it is possible to suitably detect the received-wave arrival direction in dimensions that could not be conventionally acquired while removing ambiguity, even if there are restrictions on the installation of antennas in the radome.

DESCRIPTION OF EMBODIMENTS

The following describes in detail the embodiments according to the present disclosure on the basis of the drawings. The invention is not limited by these embodiments. The components in the following embodiments include those replaceable and easy to be replaced by those skilled in the art, or those that are substantially the same. Furthermore, the components described below can be combined as appropriate, and if there are more than one embodiment, each of the embodiments can be combined one another. It should be noted that the "intensity difference" as used herein may refer to a ratio of intensities as well as a difference between intensities. The unit of values in the cells of the intensity difference table in FIG. 5 described later is actually dB in which a difference between the received intensities at two antennas results in a ratio of the two intensities in a mathematical operation.

First Embodiment

A direction detection device 1 and a direction detection method according to the first embodiment are a device and a method for detecting a received-wave arrival direction. The received wave is a radio wave, for example, a beam of a detection radar. The direction detection device 1 is disposed in transportation machinery such as aircraft, vehicles, or ships, for example. The received-wave arrival direction is determined by the angle (AZ angle) in the azimuth direction (hereinafter referred to as AZ) and the angle (EL angle) in the elevation direction (hereinafter referred to as EL).

Figure 1:
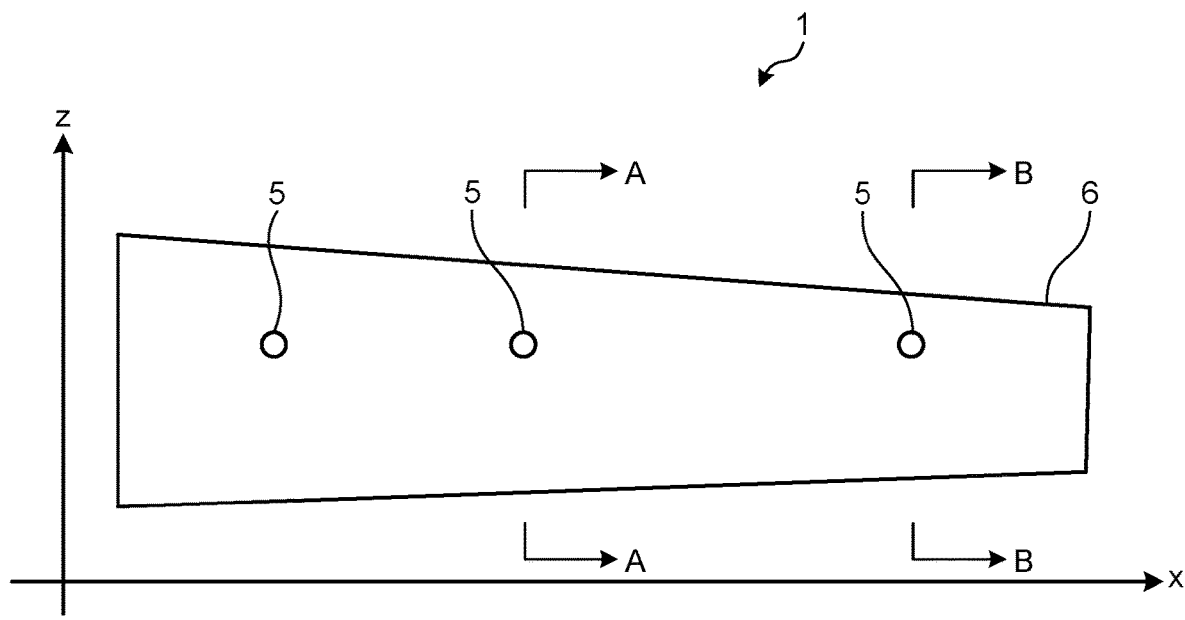
FIG. 1 is a schematic diagram of part of a direction detection device according to a first embodiment.
Figure 2:
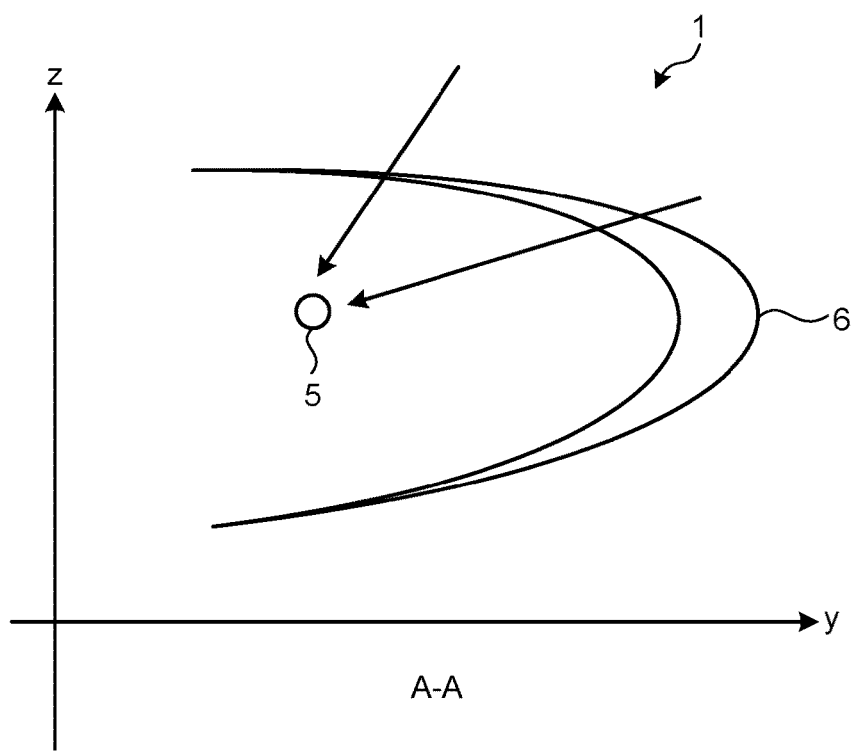
FIG. 2 is an A-A cross-section of FIG. 1.
Figure 3:
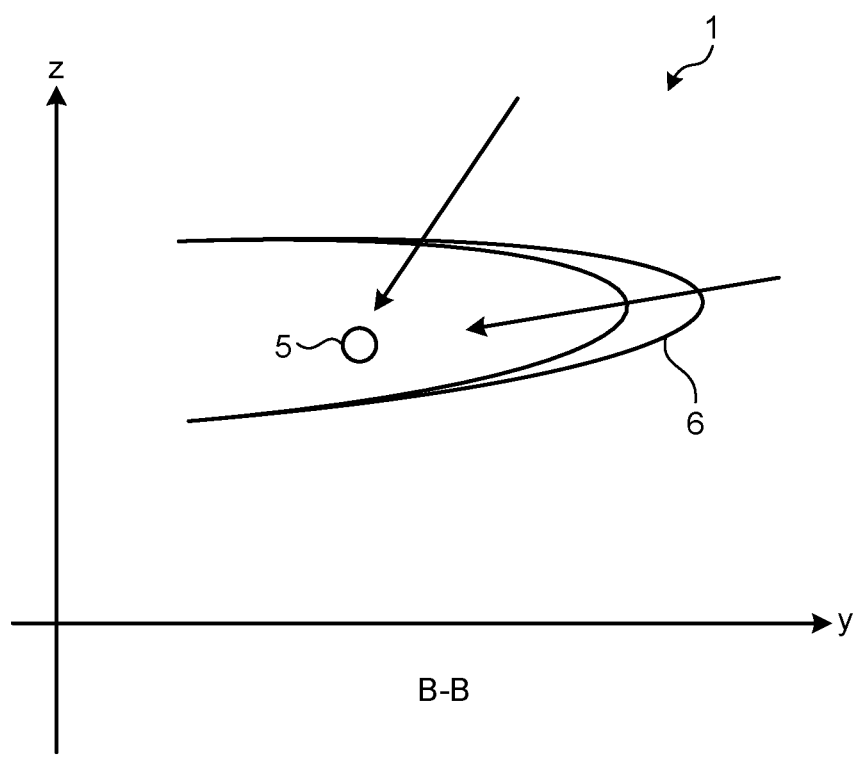
FIG. 3 is a B-B cross-section of FIG. 1.
Figure 4:
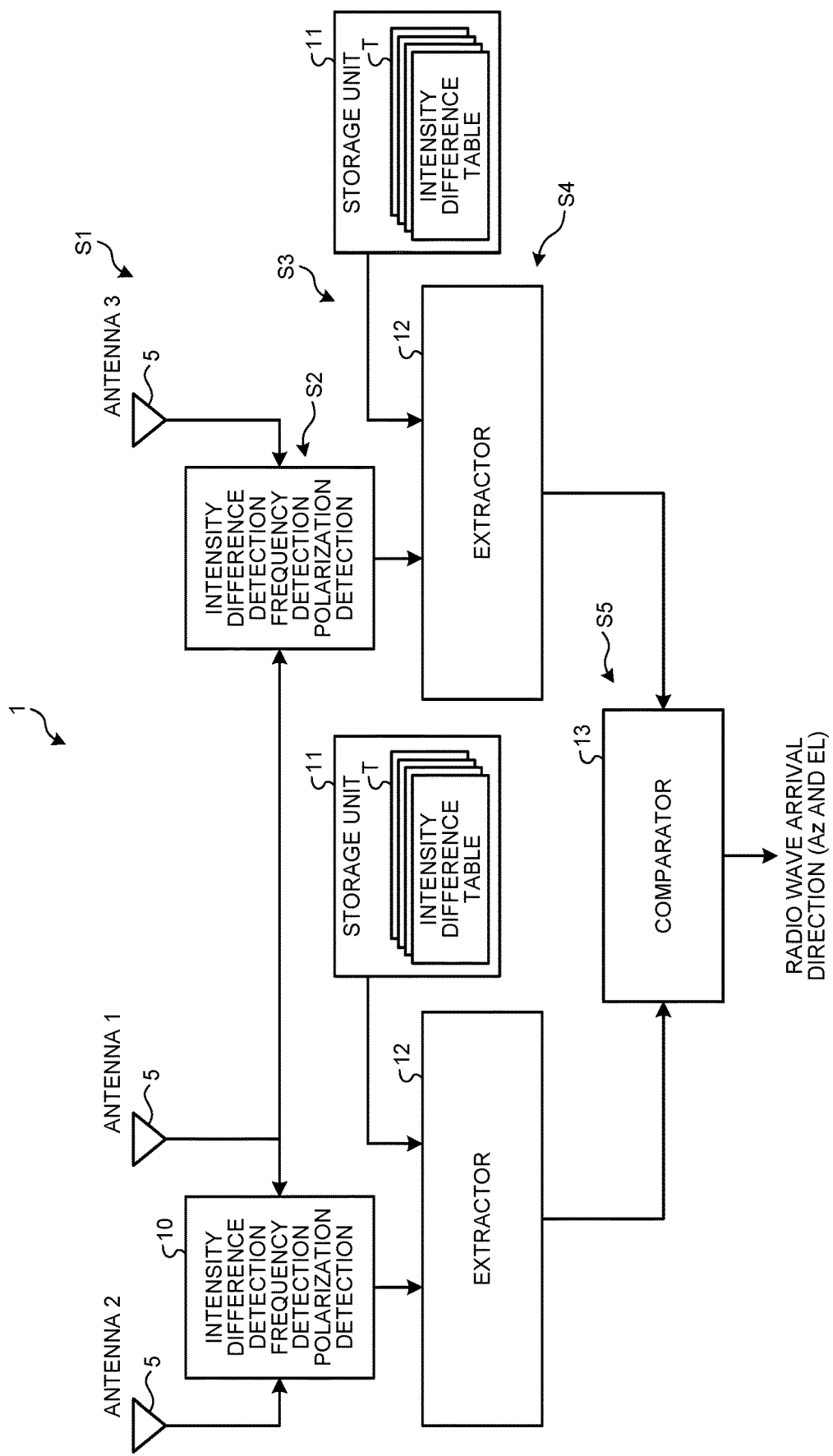
FIG. 4 is an explanatory diagram relating to the direction detection device and a direction detection method according to the first embodiment.
Figure 5:
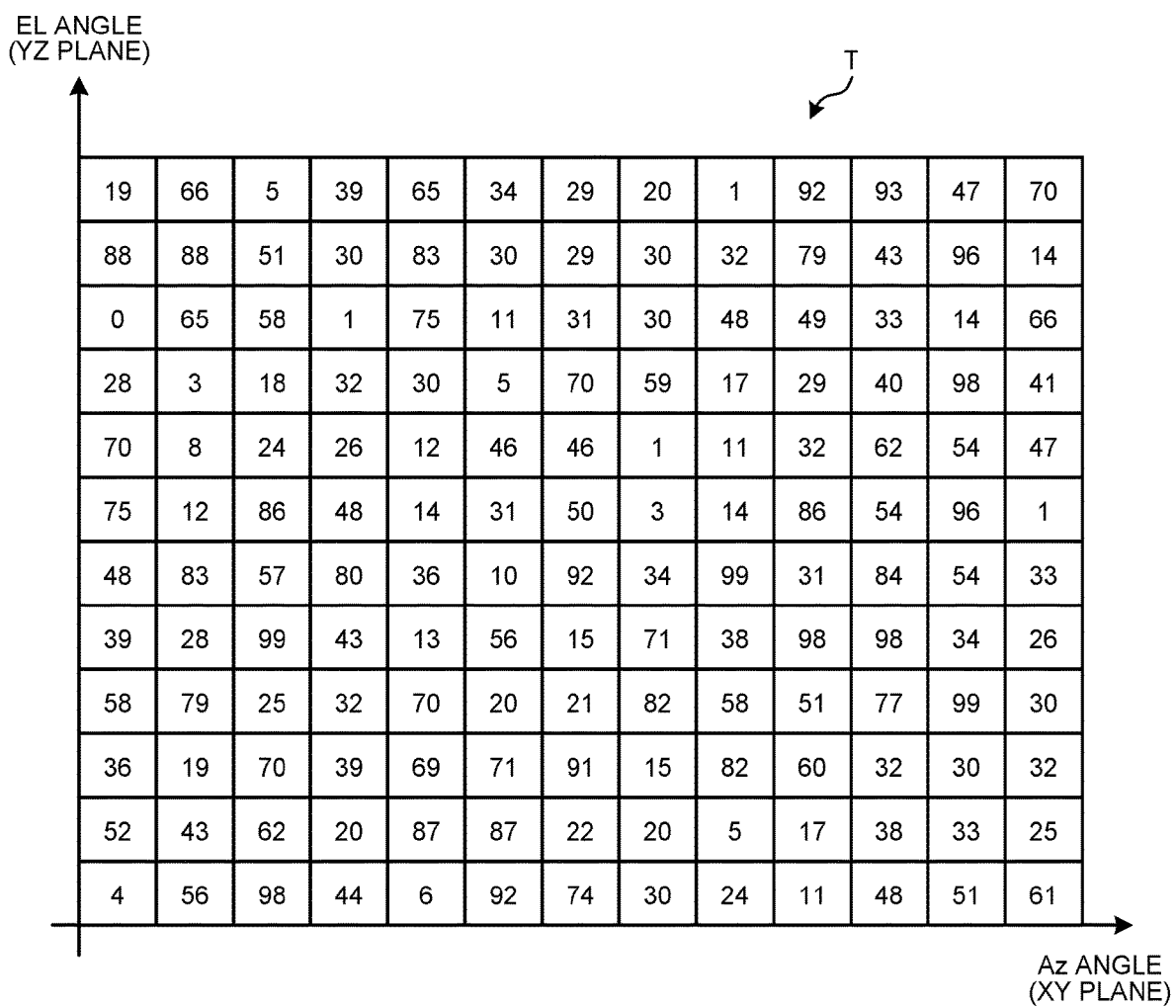
FIG. 5 is a diagram of an intensity difference table.
Figure 6:
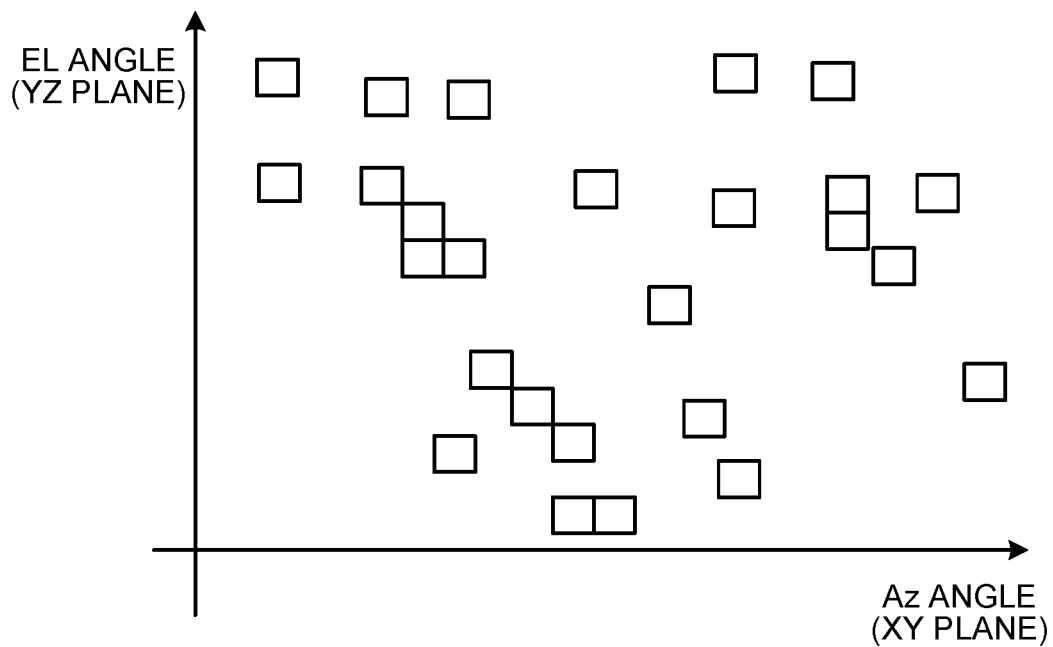
FIG. 6 is a graph indicating an example of the intensity difference table.
Figure 7:
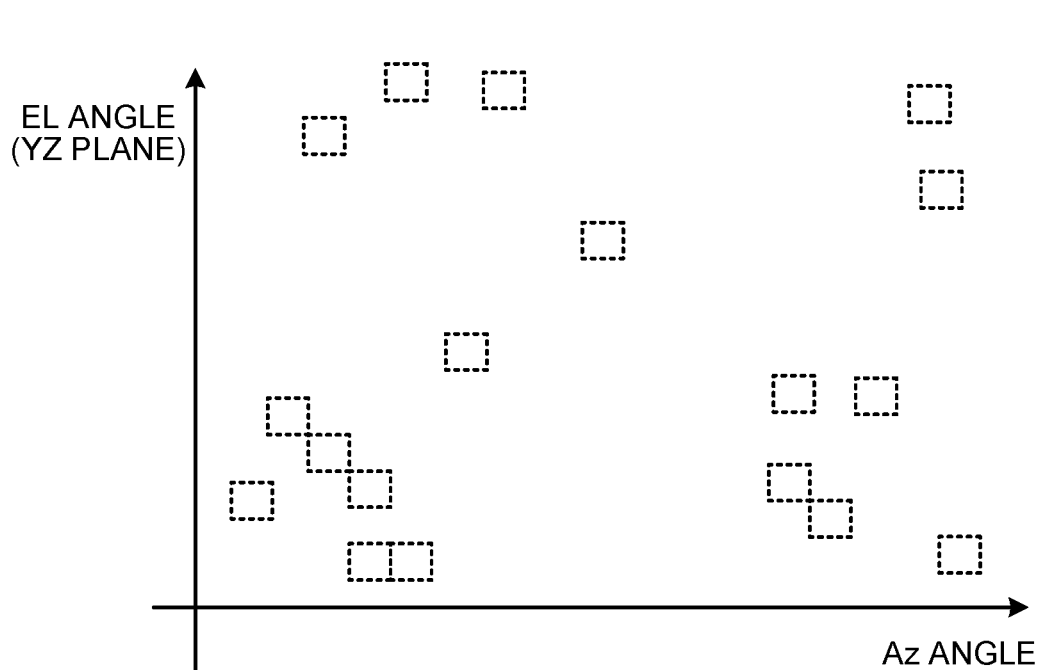
FIG. 7 is a graph indicating an example of the intensity difference table.
Figure 8:
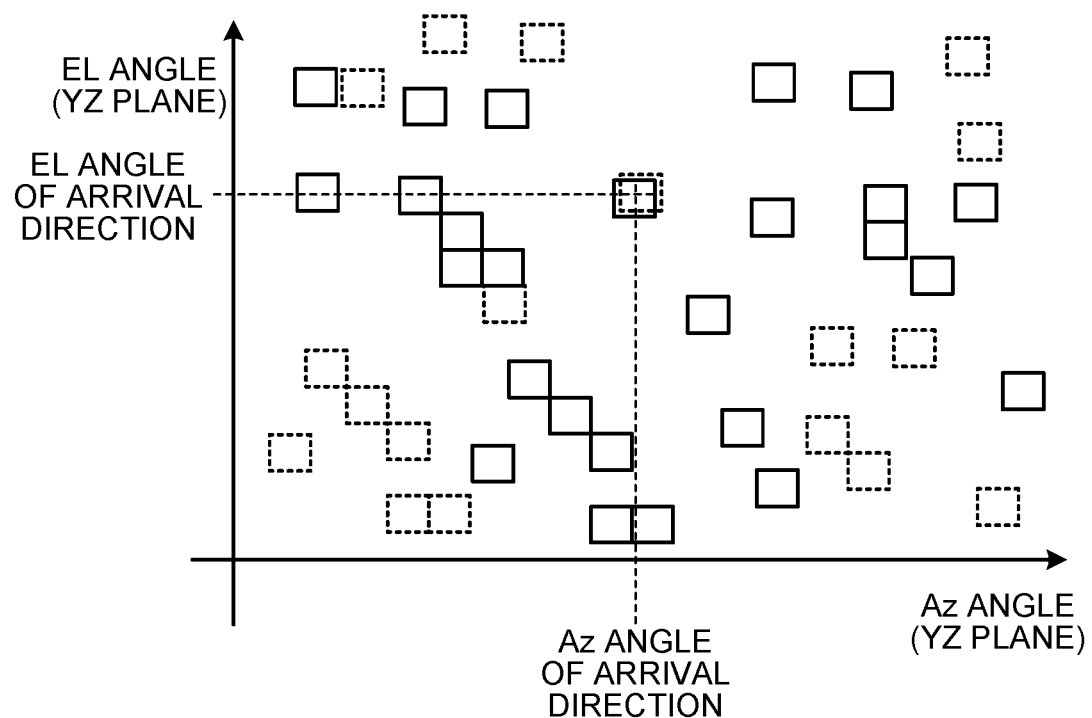
FIG. 8 is a graph on which received-wave arrival directions are superimposed.
Figure 9:
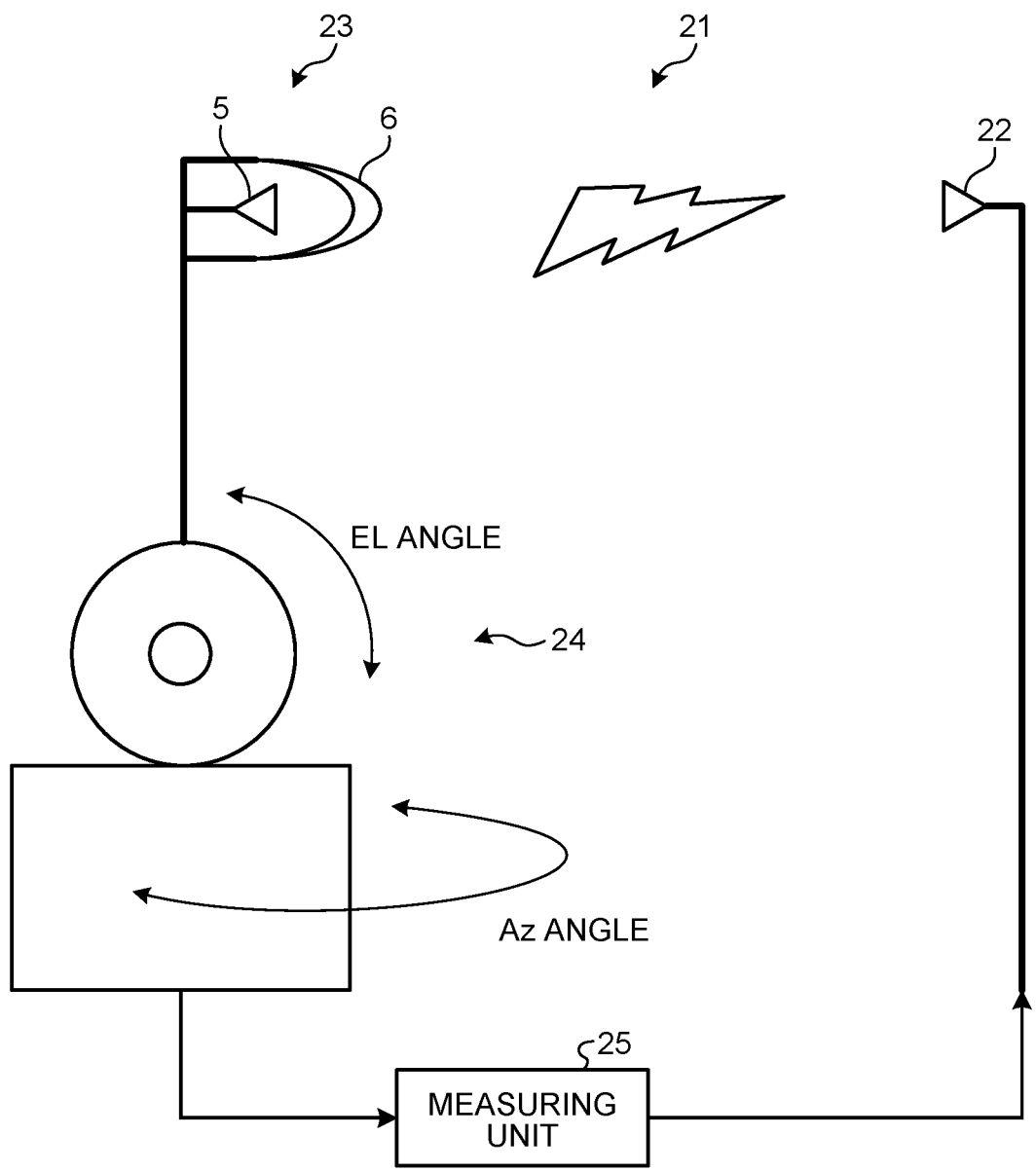
FIG. 9 is a schematic diagram of equipment used in a method of acquiring the intensity difference table.

FIG. 1 is a schematic diagram of part of the direction detection device according to the first embodiment. FIG. 2 is an A-A cross-sectional view of FIG. 1. FIG. 3 is a B-B cross-sectional view of FIG. 1. FIG. 4 is an explanatory diagram relating to the direction detection device and the direction detection method according to the first embodiment. FIG. 5 is a diagram of an intensity difference table. FIG. 6 is a graph indicating an example of the intensity difference table. FIG. 7 is a graph indicating an example of the intensity difference table. FIG. 8 is a graph on which received-wave arrival directions are superimposed. FIG. 9 is a schematic diagram of equipment used in a method of acquiring the intensity difference table.

Direction Detection Device

As illustrated in FIGS. 1 to 3, the direction detection device 1 includes a plurality of antennas 5 and a radome 6. The antennas 5 are disposed in a linear fashion along the AZ direction (x-direction in FIG. 1) and are disposed at one location in the EL direction (z-direction in FIGS. 1 to 3), thereby having a one-dimensional arrangement. Although the first embodiment has the one-dimensional arrangement so as to suppress a height in the EL direction, arrangement is not particularly limited. In the antennas 5, at least three antennas are disposed so that there are two or more combination patterns of the two antennas. The antennas 5 are arranged at predetermined distances in the AZ direction. In the first embodiment, distances between the antennas 5 are unequal, but they may be equal.

The radome 6 is disposed on a wing of an aircraft, for example. The radome 6 functions as the intensity difference imparting unit that imparts intensity differences different depending on the received-wave arrival direction. Note that the AZ direction is a wing span direction of the wing of the aircraft. Specifically, the radome 6 has a shape that is non-uniform in a three-dimensional space including the AZ and EL directions. As illustrated in FIG. 2, a cross-sectional shape of the radome 6 cut at a position of a wing root side (left side of FIG. 1) in the AZ direction is such that the inner space is wider in the EL direction. In contrast, as illustrated in FIG. 3, a cross-sectional shape of the radome 6 cut at a position of a wing tip side (right side in FIG. 1) is such that the inner space is narrower in the EL direction. In a cross section also indicated in FIGS. 2 and 3, the thickness of the radome 6 is not constant, varying depending on the EL direction.

The radome 6 has a structure that is a laminate configuration, and the radome 6 may have different shapes, different laminate configurations, or both different shapes and laminate configurations so as to impart intensity differences different depending on the received-wave arrival direction.

As illustrated in FIG. 4, the direction detection device 1 includes a detector 10, a storage unit 11, an extractor 12, and a comparator 13.

The detector 10 is connected to the antennas 5 and detects the intensity difference of signal intensities, frequencies, and polarizations of the received wave to be received by the antennas 5. Information about the polarizations may be acquired from an intensity ratio of two orthogonal linear antennas or from measurements in which one linear antenna is rotated. In this case, an antenna dedicated to detecting the polarizations may be separately disposed. The detector 10 detects the intensity difference between the two antennas 5 as an intensity difference. Here, in the first embodiment, three antennas of "Antenna 1", "Antenna 2" and "Antenna 3" are applied as the antennas 5. In this case, in the first embodiment, the detector 10 detects the intensity differences between the "Antenna 1" and the "Antenna 2", and between the "Antenna 1" and the "Antenna 3", as the intensity difference between the two antennas 5. The detector 10 may detect the intensity difference between the "Antenna 2" and the "Antenna 3", or at least two or more patterns of intensity difference depending on the combination pattern of the two antennas among the antennas 5. In the following, the direction detection device 1 and the direction detection method of the first embodiment are described on the basis of the combination of the "Antenna 1" and the "Antenna 2", and the "Antenna 1" and the "Antenna 3", but are not particularly limited to this combination, and may be applied as a direction detection device 1 and a direction detection method using intensity differences of three or more patterns. The detector 10 detects the intensity difference, the frequency, and the polarization, but it is sufficient to detect at least the intensity difference, and if necessary, may detect the frequency and the polarization.

The storage unit 11 stores therein the intensity difference table T illustrated in FIG. 5. The intensity difference table T is data in which the intensity difference between the two antennas 5 is associated with the received-wave arrival directions. In FIG. 5, the horizontal axis is the AZ angle and the vertical axis is the EL angle. The intensity difference table T consists of a plurality of cells associated with the AZ and EL angles. Each cell has an intensity difference associated therewith. Therefore, the AZ and EL angles are associated with the cells with which the intensity differences are associated. The intensity difference table T is prepared at least for each frequency or each polarization, and if necessary, an intensity difference table T corresponding to frequency, an intensity difference table T corresponding to polarization, or an intensity difference table T corresponding to frequency and polarization may be prepared. In other words, for the intensity difference table T, if not necessary, the intensity difference table T corresponding to frequency, or the intensity difference table T corresponding to polarization need not be prepared. Furthermore, the intensity difference table T is prepared for each combination of the two antennas. In other words, the first embodiment prepares, as intensity difference tables T, an intensity difference table T of the "Antenna 1" and the "Antenna 2", and an intensity difference table T of the "Antenna 1" and the "Antenna 3". Although not illustrated in a figure, the storage unit 11 stores therein a computer program for detecting the received-wave arrival direction using the direction detection device 1. The intensity difference table T includes not only the intensity difference table T illustrated in FIG. 5, but also mathematical expressions based on the intensity difference table T illustrated in FIG. 5.

The extractor 12 extracts the received-wave arrival direction corresponding to the intensity difference from the intensity difference table T using the frequencies, the polarizations and the intensity difference of the received waves detected by the detector 10. Specifically, in the first embodiment, the extractor 12 acquires, if necessary, the intensity difference table T corresponding to the frequency, the intensity difference table T corresponding to the polarizations, or the intensity difference table T corresponding to the frequency and the polarization, using the frequency and the polarization of the received wave detected in the detector 10. After this, the extractor 12 extracts the cells in the intensity difference table T that correspond to the intensity differences detected in the detector 10. The extractor 12 extracts the cells of the intensity difference table T for each of the combination of the "Antenna 1" and the "Antenna 2" and the combination of the "Antenna 1" and the "Antenna 3".

The comparator 13 acquires the received-wave arrival direction in which a plurality of candidates for the arrival direction extracted by the extractor 12 match, as a detection result. Now, referring to FIGS. 6 to 8, the following specifically describes processing by the comparator 13. FIG. 6 and FIG. 7 are diagrams where cells with the same value of the intensity difference are extracted in the intensity difference table T as illustrated in FIG. 5. FIG. 6 is a diagram where cells with a predetermined intensity difference $\Delta E_{12}$ are extracted, the predetermined intensity difference being an intensity difference between the "Antenna 1" and the "Antenna 2". FIG. 7 is a diagram where cells with a predetermined intensity difference $\Delta E_{13}$ are extracted, the predetermined intensity difference being an intensity difference between the "Antenna 1" and the "Antenna 3".

Upon acquiring the intensity difference $\Delta E_{12}$ between the "Antenna 1" and the "Antenna 2" extracted by the extractor 12, the comparator 13 acquires cells that fall within the intensity difference $\Delta E_{12}$ as illustrated in FIG. 6. Upon acquiring the intensity difference $\Delta E_{13}$ between the "Antenna 1" and the "Antenna 3" extracted by the extractor 12, the comparator 13 acquires cells that fall within the intensity difference $\Delta E_{13}$ as illustrated in FIG. 7. Then, the comparator 13 acquires, as illustrated in FIG. 8, cells in which the cells that fall within the intensity difference $\Delta E_{12}$ between the "Antenna 1" and the "Antenna 2" and the cells that fall within the intensity difference $\Delta E_{13}$ between the "Antenna 1" and the "Antenna 3" match one another. The comparator 13 then acquires the AZ and EL angles corresponding to the acquired cells as detection results. In other words, the azimuth indicated by the combination of the AZ and EL angles indicated by the cells that match one another is an azimuth that causes the "Antenna 1" and the "Antenna 2" to generate the intensity difference $\Delta E_{12}$ and also causes the "Antenna 1" and the "Antenna 3" to generate the intensity difference $\Delta E_{13}$, and matches an observation result, so that it is possible to estimate the azimuth as the received-wave arrival direction.

Intensity Difference Table Acquisition Method

Next, referring to FIG. 9, the following describes the method of acquiring the intensity difference table that is to acquire the intensity difference table T used in the direction detection device 1. An acquisition device 21 illustrated in FIG. 9 is used to acquire the intensity difference table T. The acquisition device 21 includes a transmitter 22, a receiver 23, an operating unit 24, and a measuring unit 25.

The transmitter 22 transmits radio waves that will become predetermined polarizations, toward the receiver 23. The receiver 23 is a receiver having equivalent performance that mimics the antennas 5 and the radome 6 of the direction detection device 1, and acquires radio waves that the receiver 23 has received as received waves. The operating unit 24 moves the receiver 23 so that the position of the transmitter 22 viewed from the receiver 23 is at the predetermined AZ and EL angles. The measuring unit 25 sets a transmission frequency of the transmitter 22 and acquires the intensity difference of the received wave to be received in the receiver 23, and also acquires the AZ angle and the EL angle at the time of the acquisition.

The method of acquiring the intensity difference table T executes a step of causing the receiver 23 including the antennas 5 to operate the operating unit 24 so that the arrival direction has the predetermined AZ and EL angles. Thereafter, in the acquisition method, a step is executed in which a radio wave of a predetermined frequency is generated from the transmitter 22 serving as a radio wave source. The acquisition method then executes a step of receiving the radio wave of the predetermined frequency as a received wave by the receiver 23. In the acquisition method, when the receiver 23 receives the received wave, the measuring unit 25 measures the intensity difference of the received wave. Then, in the acquisition method, a step is executed in which the measured intensity difference between the two antennas 5 is associated with the AZ and EL angles at the time of acquisition, and an intensity difference table T is acquired for each frequency and each polarization of the received wave. In the above-described method of acquiring the intensity difference table T, the intensity difference table T is acquired for each frequency and each polarization of the received wave, but the intensity difference table T may be acquired only for each frequency or each polarization.

A plurality of the intensity difference tables T prepared for each frequency or each polarization of the received waves may undergo an interpolation process in which the intensity difference between the frequencies or the polarizations is interpolated. Furthermore, each cell in the intensity difference table T is associated with an arrival direction consisting of the AZ and EL angles, but an interpolation process may be performed in which the AZ and EL angles between cells are interpolated.

Direction Detection Method

Next, referring to FIG. 4, the following describes the direction detection method for detecting the received-wave arrival direction by the direction detection device 1.

The direction detection method first executes step S1 in which the antennas 5 receive received waves. Thereafter, in the direction detection method, step S2 is executed in which the detector 10 detects the intensity difference and the frequencies or the polarizations between the two antennas 5 using the received waves received by the antennas 5. In step S2, it is not necessary to detect the frequencies or the polarizations. Subsequently, in the direction detection method, step S3 is executed in which the extractor 12 acquires the intensity difference table T corresponding to the detected frequencies or polarizations, from the storage unit 11 using the detected frequencies or the polarizations. Then, in the direction detection method, step S4 is executed in which the extractor 12 extracts, from the acquired intensity difference table T, a plurality of cells corresponding to the received-wave arrival direction corresponding to the intensity difference detected by the detector 10, that is, corresponding to the AZ angle and the EL angle, according to the combination of the two antennas 5. In the direction detection method, after the execution of step S4, step S5 is executed in which the acquired cells of the AZ and EL angles are compared one another in the comparator 13 and the AZ and EL angles of the cells that match are acquired as the detection results. In the direction detection method of the first embodiment, the corresponding intensity difference table T used on the basis of the frequencies or the polarizations, but the corresponding intensity difference table T may be used on the basis of the frequency and the polarization.

Second Embodiment

Figure 10:
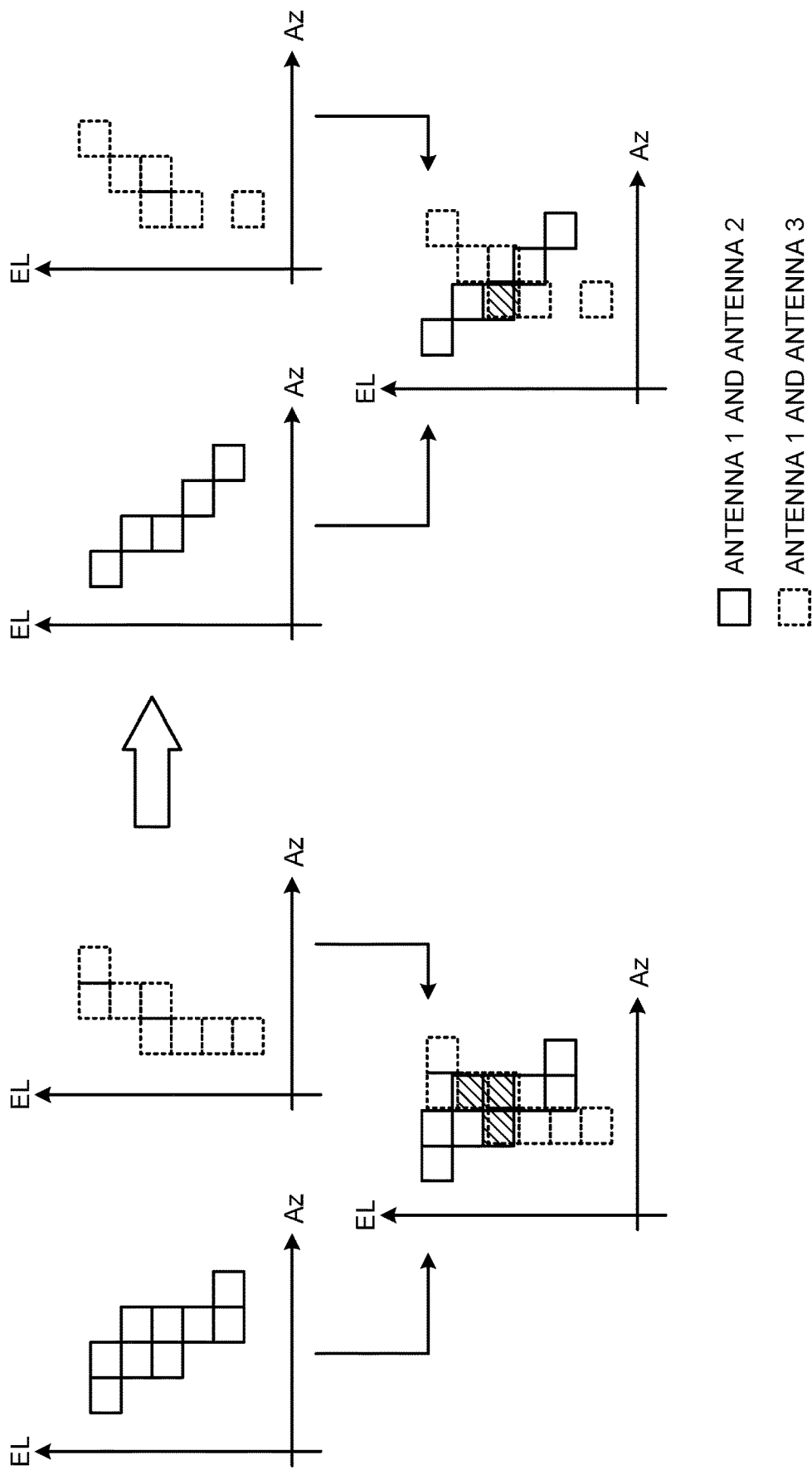
FIG. 10 is an explanatory diagram of an example relating to a direction detection device and a direction detection method according to a second embodiment.
Figure 11:
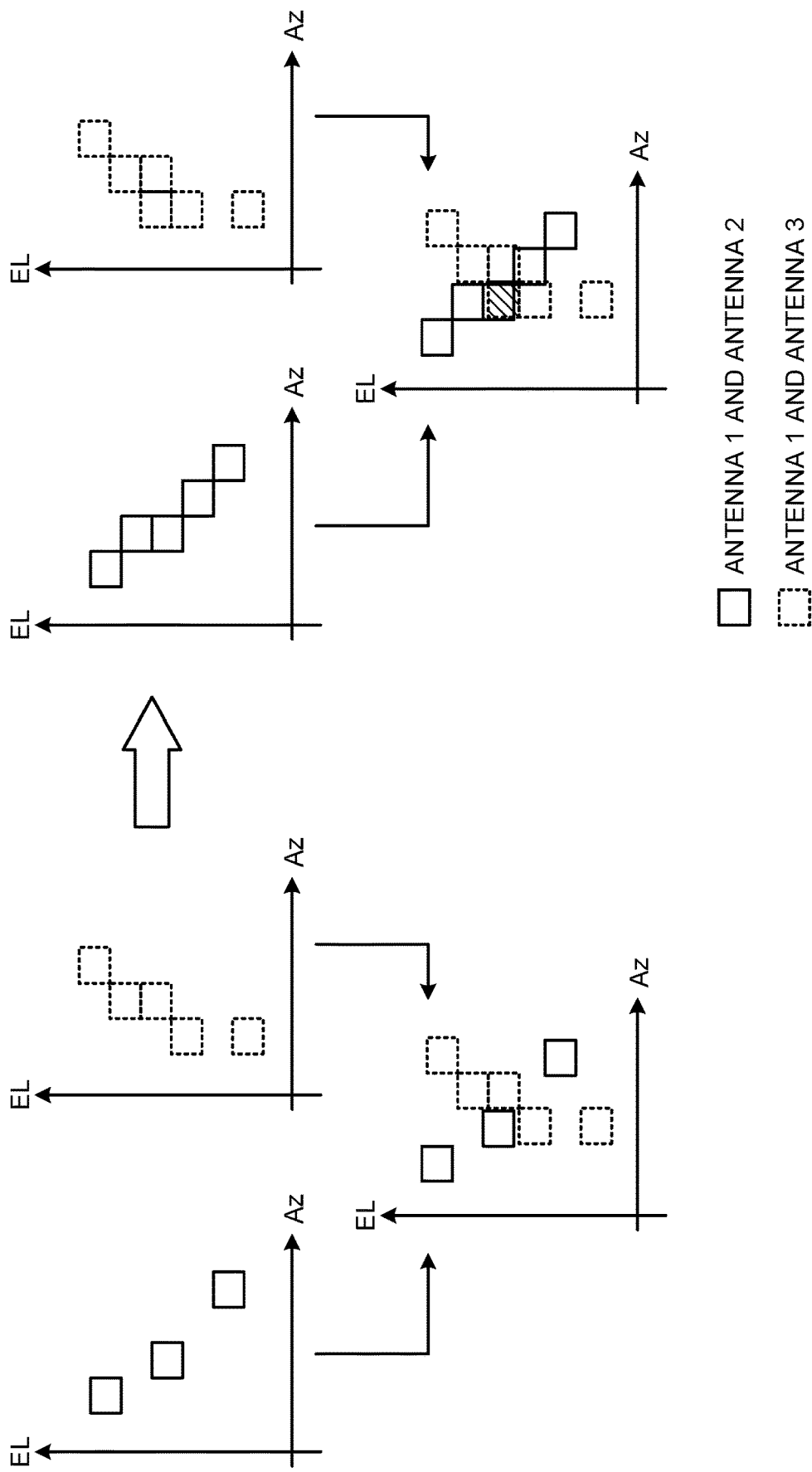
FIG. 11 is an explanatory diagram of an example relating to the direction detection device and the direction detection method according to the second embodiment.

Next, referring to FIGS. 10 and 11, the following describes the second embodiment. In order to avoid duplicate descriptions, part of the second embodiment that is different from the first embodiment is described, and part that has the same configuration as the first embodiment is described with the same symbol. FIG. 10 is an explanatory diagram of an example relating to a direction detection device and a direction detection method according to the second embodiment. FIG. 11 is an explanatory diagram of an example relating to the direction detection device and the direction detection method according to the second embodiment.

In the direction detection method of the first embodiment, the extractor 12 extracts the cells corresponding to the intensity difference detected by the detector 10 according to the combination of the two antennas 5. In this case, there may be more than one cell that match in the comparator 13, as illustrated on the left side of FIG. 10. In the comparator 13, there may be no cell that matches as illustrated on the left side of FIG. 11.

Thus, in the direction detection method of the second embodiment, the extractor 12 extracts the received-wave arrival direction corresponding to the intensity difference width obtained by imparting the adjustment width ($\alpha$, $\beta$) to the intensity difference $\Delta E$ detected by the detector 10. Specifically, the extractor 12 acquires, when acquiring the intensity difference $\Delta E$ from the detector 10, generates "$\Delta E - \alpha < \Delta E < \Delta E + \beta$" as the intensity difference width and acquires a cell corresponding to the generated intensity difference width. Here, the extractor 12 reduces the number of cells to be acquired by decreasing an adjustment width ($\alpha$, $\beta$), or increases the number of cells to be acquired by increasing the adjustment width ($\alpha$, $\beta$). The adjustment width ($\alpha$, $\beta$) may be the same among the all antennas 5, or may be different among the antennas 5.

Specifically, as illustrated on the left side of FIG. 10, when the comparator 13 acquires and compares the cells that fall within the intensity difference width between the "Antenna 1" and the "Antenna 2", and the cells that fall within the intensity difference width between the "Antenna 1" and the "Antenna 3", resulting in more than one cell that match, the extractor 12 narrows the intensity difference width. This narrowing reduces the number of the cells that fall within the intensity difference width between the "Antenna 1" and the "Antenna 2", and the number of the cells that fall within the intensity difference width between the "Antenna 1" and the "Antenna 3". Then, the comparator 13 again acquires and compares the cells that fall within the intensity difference width between the "Antenna 1" and the "Antenna 2" and the cells that fall within the intensity difference width between the "Antenna 1" and the "Antenna 3", so as to be able to find cells that match, as illustrated on the right side of FIG. 10.

As illustrated on the left side of FIG. 11, the comparator 13 acquires and compares the cells that fall within the intensity difference width between the "Antenna 1" and the "Antenna 2" and the cells that fall within the intensity difference width between the "Antenna 1" and the "Antenna 3", resulting in no cells that match, that is, the cells are inconsistent, the extractor 12 widens the intensity difference width. This widening increases the number of cells that fall within the intensity difference width between the "Antenna 1" and the "Antenna 2", and the number of cells that fall within the intensity difference width between the "Antenna 1" and the "Antenna 3". Then, the comparator 13 again acquires and compares the cells that fall within the intensity difference width between the "Antenna 1" and the "Antenna 2", and the cells that fall within the intensity difference width between the "Antenna 1" and the "Antenna 3", so as to be able to find cells that match, as illustrated on the right side of FIG. 11.

Third Embodiment

Figure 12:
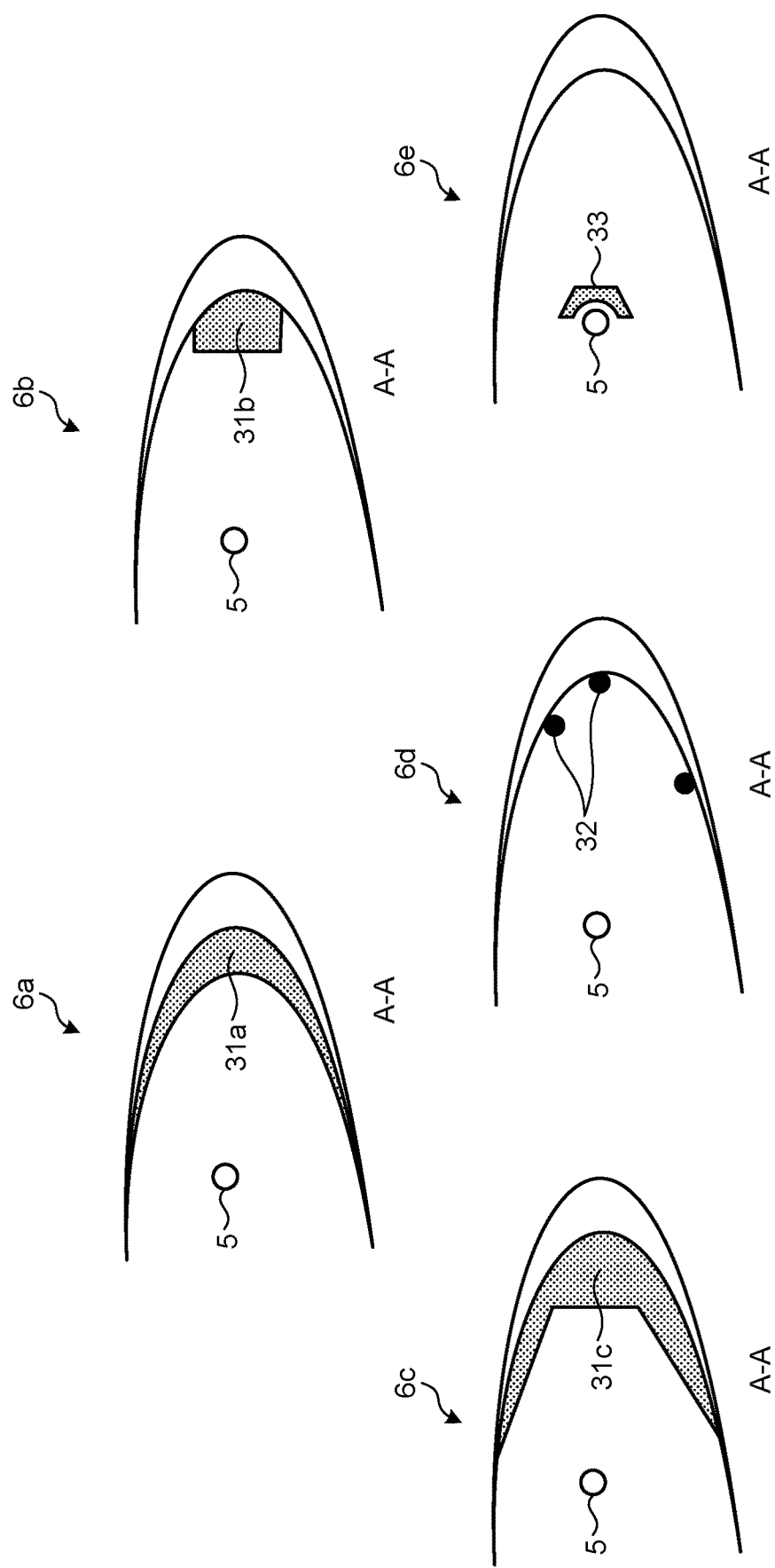
FIG. 12 is a cross-sectional view illustrating an example of a shape of a radome of a direction detection device according to a third embodiment.

Next, referring to FIG. 12, the following describes the third embodiment. In order to avoid duplicate descriptions, part of the third embodiment that is different from the first and second embodiments is described, and part that has the same configuration as the first and second embodiments is described with the same symbol. FIG. 12 is a cross-sectional view illustrating an example of a shape of the radome of the direction detection device according to the third embodiment.

In the direction detection method of the first embodiment, the extractor 12 extracts the cells corresponding to the intensity difference detected by the detector 10 according to the combination of the two antennas 5. In this case, there may be more than one cell that match, and the comparator 13 may fail to narrow down cells that match even by adjusting the intensity difference width. This is because the radome 6 has part to which intensity differences different depending on the received-wave arrival direction is not imparted, or part in which the imparting is insufficient.

For this reason, the third embodiment has, as illustrated in FIG. 12, a configuration in which a material for changing electrical characteristics is added to the radome 6 of the direction detection device 1. For example, a dielectric, metal, or other good conductor can be used as a material for changing the electrical characteristics. The following describes a configuration in which a dielectric 31 is added. In the dielectric 31, it is sufficient that intensity differences different depending on the received-wave arrival direction are imparted, for example, dielectrics 31*a* to 31*c*, 32, and 33 in FIG. 12 may be arranged. In the radome 6*a* of FIG. 12, the dielectric 31*a* is disposed following the inside of the radome 6*a*, and the dielectric 31*a* has an inner surface that is a curved surface. In the radome 6*b* of FIG. 12, the dielectric 31*b* has a block shape that protrudes from the inside of the radome 6*a*. In the radome 6*c* of FIG. 12, the dielectric 31*c* is disposed following the inside of the radome 6*c*, the dielectric 31*c* has an inner surface the part of which facing the antenna 5 is a flat surface, and the flat surface has a surface connected to both sides in the EL direction, the surface also being a flat surface. In the radome 6*d* in FIG. 12, a separate dielectric 32 is attached to the inside of the radome 6*a*. In the radome 6*e* of FIG. 12, a dielectric 33 having a cap shape is attached to cover the antenna 5.

Although not illustrated, a material for changing the electrical characteristics, such as a dielectric 31, may be arranged on the outside of the radome 6. For example, when the direction detection device 1 is mounted on an aircraft, an airframe on the outside of the radome 6 may be used as a material for changing the electrical characteristics. In other words, the airframe on the outside of the radome 6 may function as an intensity difference imparting unit that imparts intensity differences different depending on the received-wave arrival direction.

Fourth Embodiment

Next, the following describes the fourth embodiment. In order to avoid duplicate descriptions, part of the fourth embodiment that differ from the first to third embodiments is described, and part that has the same configuration as the first to third embodiments is described with the same symbol.

In the first embodiment, the radome 6 of the direction detection device functions as the intensity difference imparting unit, but in the fourth embodiment, the antennas 5 have elements the gains of which are spatially non-uniform, so that the antennas 5 themselves may function as the intensity difference imparting unit. In other words, the elements of the antennas 5 have different gains, respectively, so that it is possible to acquire intensity differences different depending on the received-wave arrival direction.

Fifth Embodiment

Figure 13:
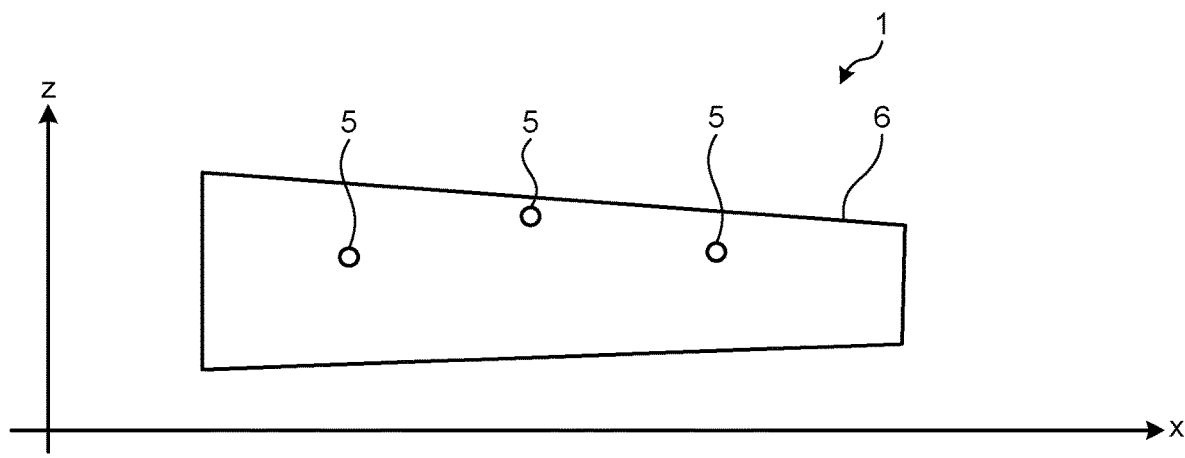
FIG. 13 is a schematic diagram illustrating an example of arrangement of a plurality of antennas of a direction detection device according to a fifth embodiment.
Figure 14:
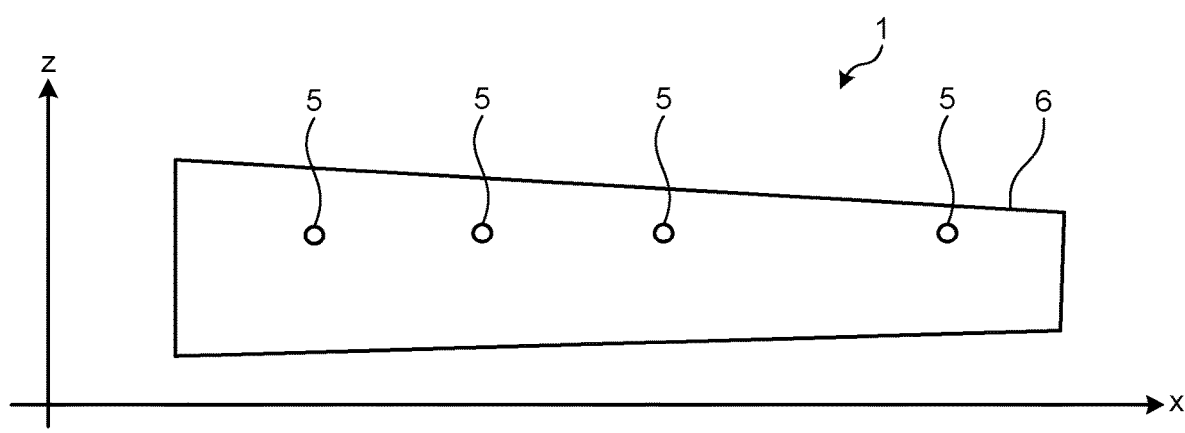
FIG. 14 is a schematic diagram illustrating an example of the arrangement of the antennas of the direction. detection device according to the fifth embodiment.

Next, referring to FIGS. 13 and 14, the following describes the fifth embodiment. In order to avoid duplicate descriptions, part of the fifth embodiment that is different from the first to fourth embodiments is described, and part that has the same configuration as the first to fourth embodiments is described with the same symbol. FIGS. 13 and 14 are schematic diagrams illustrating an example of the arrangement of a plurality of antennas of the direction detection device according to the fifth embodiment.

In the first embodiment, the three antennas 5 are arranged side by side in the AZ direction, but they may be arranged at different heights in the EL direction, as illustrated in FIG. 13. In other words, the three antennas 5 may be arranged as a three-point arrangement. This is because in the direction detection method using the intensity difference table T, ambiguity is canceled by imparting intensity differences different depending on the received-wave arrival direction by the intensity difference imparting unit, so that there are no restrictions on the arrangement of the antennas 5. As illustrated in FIG. 14, four antennas may be arranged as a plurality of the antennas 5. In this case, the distances between the antennas 5 may be unequal or equal. When the four antennas 5 are arranged, three may be used as regular antennas 5 and one may be used as a spare antenna 5. When increasing the number of antennas 5 makes it difficult for the comparator 13 to narrow down cells that match, it is possible to increase the number of combinations of the antennas 5 and also increase the number of combinations using the spare antennas 5.

The first to fifth embodiments have a configuration in which the received-wave arrival direction is detected using the intensity difference table T, in which the intensity difference in each cell is acquired, while changing the AZ and EL angles, but are not particularly limited to this configuration. For example, the first to fifth embodiments may have a configuration in which, while the radome 6 is being deformed under load, the intensity difference in each cell is acquired to generate an intensity difference table T, and the received-wave arrival direction is detected using the generated intensity difference table T, considering the deformation of the radome 6 under load.

As in the foregoing, the direction detection device 1, the method of acquiring the intensity difference table T, the directiondetection method, and the direction detection program described in the embodiments are understood, for example, as follows.

In the direction detection device 1 according to the first aspect, the direction detection device 1 that detects the received-wave arrival direction includes: a plurality of antennas 5 that receive the received wave; an intensity difference imparting unit (radome 6, dielectric 31, good conductor, antenna elements having gains that are spatially non-uniform) that imparts intensity differences different depending on the received-wave arrival direction to the intensities of the received wave to be received at the antennas 5; a storage unit 11 that stores an intensity difference table T in which the intensity difference between two of the antennas 5 is associated with the received-wave arrival direction, for each combination of any two of the antennas 5; a detector 10 that detects the intensity difference between the two antennas 5 of the received wave to be received at the antennas 5; an extractor 12 that extracts, from the intensity difference table T stored in the storage unit 11, a plurality of received-wave arrival directions corresponding to the intensity difference detected by the detector 10, for each combination of any two of the antennas 5; and a comparator 13 that compares the received-wave arrival directions extracted by the extractor 12 between the combinations of the antennas 5 to acquire a matched received-wave arrival direction as a detection result.

With this configuration, even when the antennas 5 are arranged because of physical restrictions in the internal space of the radome 6, by using the intensity difference table T, it is possible to eliminate ambiguity and suitably acquire a three-dimensional arrival direction of the received wave.

In the second aspect, the intensity difference table T is stored for each frequency or for each polarization of the received wave, the detector 10 detects the frequency or the polarization of the received wave, and the extractor 12 acquires the intensity difference table T corresponding to the frequency or the polarization by using the frequency or the polarization detected by the detector 10, and extracts, from the acquired intensity difference table T, a plurality of received-wave arrival directions corresponding to the intensity difference detected by the detector 10.

With this configuration, since the intensity difference table T can be acquired for each frequency or each polarization, the appropriate intensity difference corresponding to the frequency and the polarization can be acquired, and the received-wave arrival direction with good accuracy corresponding to the intensity difference can be extracted.

In the third aspect, the intensity difference imparting unit includes a radome 6 that houses the antennas 5, and the radome 6 has a non-uniform shape or a non-uniform structure in three-dimensional space.

With this configuration, the radome 6 has a non-uniform shape or a non-uniform structure in a three-dimensional space, so that it is possible to impart intensity differences different depending on the received-wave arrival direction.

In the fourth aspect, the intensity difference imparting unit disposed in the radome 6 that houses the antennas 5, and has a material (dielectric 31, good conductor) that changes an electrical characteristic of the received wave.

With this configuration, a material that changes the electrical characteristics is disposed in the radome 6, so that it is possible to easily impart intensity differences different depending on the received-wave arrival direction.

In the fifth aspect, the intensity difference imparting unit is implemented as the elements of the antennas 5 having gains which are spatially non-uniform.

With this configuration, the antennas 5 have elements the gains of which are spatially non-uniform, so that it is possible to allow the antennas 5 themselves to function as the intensity difference imparting unit. In other words, the elements of the antennas 5 have different gains, respectively, so that it is possible to impart intensity differences different depending on the received-wave arrival direction.

In the sixth aspect, the extractor 12 extracts a plurality of received-wave arrival directions corresponding to an intensity difference width obtained by imparting an adjustment width to the intensity difference detected by the detector 10, and the comparator 13, when there is no matched candidate for the received-wave arrival direction corresponding to the intensity difference width between the combinations of the antennas, widens the adjustment width, whereas when there are a plurality of matched candidates for the received-wave arrival direction, narrows the adjustment width.

With this configuration, the adjustment width is adjusted, so that it is possible to appropriately find a received-wave arrival direction that matches.

In the seventh aspect, the received-wave arrival direction is defined by an AZ angle, which is an angle in the azimuthal direction, and an EL angle, which is an angle in the elevation direction orthogonal to the azimuthal direction, and the intensity difference table T has a plurality of cells each identified by an AZ angle and an EL angle, and in the intensity difference table T, an intensity difference is set in each cell, and intensity differences are interpolated between the cells.

With this configuration, the intensity difference between cells can be interpolated appropriately, so that it is possible to accurately acquire the intensity difference and appropriately acquire the received-wave arrival direction corresponding to the intensity difference.

In the eighth aspect, when the intensity difference table T is prepared for each frequency or each polarization of the received wave, in the intensity difference table T, intensity differences are interpolated between the frequencies or between the polarizations.

With this configuration, the intensity difference between frequencies and between polarizations can be appropriately interpolated, so that it is possible to accurately acquire the intensity difference between the frequencies and the polarizations, and appropriately acquire the received-wave arrival direction corresponding to the intensity difference.

The method of acquiring an intensity difference table T according to the ninth aspect is a method of acquiring the intensity difference table T used in the direction detection device 1 described above, the method executing: setting up radio wave source (transmitter 22) for generating the received wave so that the received wave is in a predetermined arrival direction with respect to the plurality of antennas 5; causing the radio wave source to generate the received wave; receiving the received wave by the antennas 5; and acquiring the intensity difference table T in which an intensity difference of the received wave between two of the antennas 5 is associated with a received-wave arrival direction.

With this configuration, it is possible to acquire the intensity difference table T that appropriately associate the intensity difference with the received-wave arrival direction.

The direction detection method according to the tenth aspect is a direction detection method of detecting a received-wave arrival direction of a received wave by the direction detection device 1 described above, the direction detection method including: step S1 of receiving the received wave by the plurality of antennas 5; step S2 of detecting, by the detector 10, an intensity difference between two of the antennas 5 of the received wave to be received at the antennas 5; steps S3 and S4 of extracting, by the extractor 12, from the intensity difference table T stored in the storage unit 11, a plurality of received-wave arrival directions corresponding to the intensity difference detected by the detector 10, for each combination of any two of the antennas 5; and step S5 of comparing, by the comparator 13, the received-wave arrival directions extracted between the combinations of the antennas to acquire a matched received-wave arrival direction as a detection result.

With this configuration, even when the antennas 5 are arranged because of physical restrictions in the internal space of the radome 6, by using the intensity difference table T, it is possible to eliminate ambiguity and suitably acquire a three-dimensional arrival direction of the received wave.

The direction detection device 1 may include a computer including at least a processor and a memory; the direction detection program may be stored on a computer-readable storage medium, such as a magnetic disk, an optical disc, or a semiconductor memory, to be executed by the computer. A non-transitory computer-readable according to the eleventh aspect stores the direction detection program for detecting a received-wave arrival direction of a received wave, the direction detection program, when executed by a computer of the direction detection device described above, causing the direction detection device to: receive the received wave by the plurality of antennas 5; detect an intensity difference between two of the antennas 5 of the received wave to be received at the antennas 5; extract, from the intensity difference table T stored in the storage unit 11, a plurality of received-wave arrival directions corresponding to the detected intensity difference, for each combination of any two of the antennas 5; and compare the received-wave arrival directions extracted between the combinations of the antennas to acquire a matched received-wave arrival direction as a detection result.

With this configuration, even when the antennas 5 are arranged because of physical restrictions in the internal space of the radome 6, by using the intensity difference table T, it is possible to eliminate ambiguity and suitably acquire a three-dimensional arrival direction of the received wave.

REFERENCE SIGNS LIST

1 Direction detection device
5 Antenna
6 Radome
10 Detector
11 Storage unit
12 Extractor
13 Comparator
21 Acquisition device
22 Transmitter
23 Receiver
24 Operating unit
25 Measuring unit
31a to 31c, 32, 33 Dielectric
T Intensity difference table

The invention claimed is:

1. A direction detection device for detecting a received-wave arrival direction of a received wave, the arrival direction of the received wave being defined by an AZ angle and an EL angle, the direction detection device comprising:

three or more antennas for receiving the received wave, the three or more antennas including a first combination of any two of the three or more antennas and a second combination of any two of the three or more antennas, wherein the three or more antennas are arranged linearly;

an intensity difference imparting unit configured to impart different intensity differences depending on the received-wave arrival direction to intensities of the received wave to be received at the antennas;

a detector configured to detect:
   a first intensity difference between the any two of the three or more antennas in the first combination of the received wave to be received at the antennas, and
   a second intensity difference between the any two of the three or more antennas in the second combination of the received wave to be received at the antennas;

a storage unit storing:
   a first intensity difference table having a plurality of first cells each identified by an AZ angle and an EL angle, and in which an intensity difference between the any two of the three or more antennas in the first combination is set in each of the first cells, and
   a second intensity difference table having a plurality of second cells each identified by an AZ angle and an EL angle, and in which an intensity difference between the any two of the three or more antennas in the second combination is set in each of the second cells;

an extractor configured to extract:
   from the first intensity difference table stored in the storage unit, a plurality of first candidate cells corresponding to the first intensity difference detected by the detector, and
   from the second intensity difference table stored in the storage unit, a plurality of second candidate cells corresponding to the second intensity difference detected by the detector; and a comparator configured to compare AZ and EL angles associated with the first candidate cells with AZ and EL angles associated with the second candidate cells to acquire cells which match one another, wherein the AZ and EL angles corresponding to the acquired cells are a detection result, wherein provision of different intensity differences according to the arrival direction of the received wave by the intensity difference imparting unit is due to at least one of:
   (i) the intensity difference imparting unit having a non-uniform shape in three-dimensional space;
   (ii) the intensity difference imparting unit having a non-uniform structure in three-dimensional space;
   (iii) the intensity difference imparting unit having a material that changes an electrical characteristic of the received wave; and
   (iv) the three or more antennas being circularly polarized, and elements of the circularly polarized antennas having spatially non-uniform gains.

2. The direction detection device according to claim 1, wherein:

The first and second intensity difference tables are stored for each frequency or for each polarization of the received wave, the detector detects the frequency or the polarization of the received wave, and the extractor acquires the first and second intensity difference tables corresponding to the frequency or the polarization by using the frequency or the polarization detected by the detector, and extracts, from the acquired first and second intensity difference tables, the plurality of first and second candidate cells corresponding to the first and second intensity differences detected by the detector.

3. The direction detection device according to claim 1, wherein:
the intensity difference imparting unit includes a radome housing the three ore more antennas, and
the radome has the non-uniform shape or the non-uniform structure in three-dimensional space.

4. The direction detection device according to claim 1, wherein the intensity difference imparting unit is in a radome housing the three or more antennas, and has the material that changes an electrical characteristic of the received wave.

5. The direction detection device according to claim 1, wherein:
the extractor is configured to extract a plurality of first and second candidate cells corresponding to first and second intensity difference widths obtained by imparting an adjustment width to the first and second intensity differences detected by the detector, and
the comparator, when there is no cell with matching values of the first and second intensity difference widths among the extracted first and second candidate cells, widens the adjustment width, and when there are a plurality of cells with matching values of the first and second intensity difference widths among the extracted first and second candidate cells, narrows the adjustment width.

6. The direction detection device according to claim 1, wherein:
the AZ angle is an angle in an azimuthal direction, and the EL angle is an angle in an elevation direction orthogonal to the azimuthal direction, and
the intensity differences are interpolated between the first and second cells in the first and second intensity tables.

7. The direction detection device according to claim 1, wherein:
when the first and second intensity difference tables are prepared for each frequency or each polarization of the received wave,
in the first and second intensity difference tables, intensity differences are interpolated between the frequencies or between the polarizations.

8. A method of acquiring the intensity difference table used in a direction detection device for detecting a received-wave arrival direction of a received wave, the direction detection device comprising a plurality of antennas for receiving the received wave; an intensity difference imparting unit to impart different intensity differences depending on the received-wave arrival direction to intensities of the received wave to be received at the antennas; a storage unit to store an intensity difference table in which an intensity difference between two of the antennas is associated with the received-wave arrival direction, for each combination of any two of the antennas; a detector to detect the intensity difference between the two antennas of the received wave to be received at the antennas; an extractor to extract, from the intensity difference table stored in the storage unit, a plurality of received-wave arrival directions corresponding to the intensity difference detected by the detector, for each combination of any two of the antennas; and a comparator to compare the received-wave arrival directions extracted by the extractor between the combinations of the antennas to acquire a matched received-wave arrival direction as a detection result, the method comprising:
setting up a radio wave source for generating the received wave so that the received wave is in a predetermined arrival direction with respect to the plurality of antennas;
causing the radio wave source to generate the received wave;
receiving the received wave by the antennas; and
acquiring the intensity difference table in which an intensity difference of the received wave between two of the antennas is associated with a received-wave arrival direction.

9. A direction detection method of detecting a received-wave arrival direction of a received wave by a direction detection device for detecting a received-wave arrival direction of the received wave, the direction detection device comprising a plurality of antennas for receiving the received wave; an intensity difference imparting unit to impart different intensity differences depending on the received-wave arrival direction to intensities of the received wave to be received at the antennas; a storage unit to store an intensity difference table in which an intensity difference between two of the antennas is associated with the received-wave arrival direction, for each combination of any two of the antennas; a detector to detect the intensity difference between the two antennas of the received wave to be received at the antennas; an extractor to extract, from the intensity difference table stored in the storage unit, a plurality of received-wave arrival directions corresponding to the intensity difference detected by the detector, for each combination of any two of the antennas; and a comparator to compare the received-wave arrival directions extracted by the extractor between the combinations of the antennas to acquire a matched received-wave arrival direction as a detection result, the direction detection method comprising:
receiving the received wave by the plurality of antennas;
detecting, by the detector, an intensity difference between two of the antennas of the received wave to be received at the antennas;
extracting, by the extractor, from the intensity difference table stored in the storage unit, a plurality of received-wave arrival directions corresponding to the intensity difference detected by the detector, for each combination of any two of the antennas; and
comparing, by the comparator, the received-wave arrival directions extracted between the combinations of the antennas to acquire a matched received-wave arrival direction as a detection result,
wherein the intensity difference table is acquired by:
setting up a radio wave source for generating the received wave so that the received wave is in a predetermined arrival direction with respect to the plurality of antennas;
causing the radio wave source to generate the received wave;
receiving the received wave by the antennas; and
acquiring the intensity difference table in which an intensity difference of the received wave between two of the antennas is associated with a received-wave arrival direction.

10. A non-transitory computer-readable storage medium storing a direction detection program for detecting a received-wave arrival direction of a received wave, the direction detection program, when executed by a computer of a direction detection device for detecting a received-wave arrival direction of the received wave, the direction detection device comprising a plurality of antennas for receiving the received wave; an intensity difference imparting unit to impart different intensity differences depending on the received-wave arrival direction to intensities of the received wave to be received at the antennas; a storage unit to store an intensity difference table in which an intensity difference between two of the antennas is associated with the received-wave arrival direction, for each combination of any two of the antennas; a detector to detect the intensity difference between the two antennas of the received wave to be received at the antennas; an extractor to extract, from the intensity difference table stored in the storage unit, a plurality of received-wave arrival directions corresponding to the intensity difference detected by the detector, for each combination of any two of the antennas; and a comparator to compare the received-wave arrival directions extracted by the extractor between the combinations of the antennas to acquire a matched received-wave arrival direction as a detection result, causing the direction detection device to:

receive the received wave by the plurality of antennas;

detect an intensity difference between two of the antennas of the received wave to be received at the antennas;

extract, from the intensity difference table stored in the storage unit, a plurality of received-wave arrival directions corresponding to the detected intensity difference, for each combination of any two of the antennas; and compare the received-wave arrival directions extracted between the combinations of the antennas to acquire a matched received-wave arrival direction as a detection result, wherein the intensity difference table is acquired by:

setting up a radio wave source for generating the received wave so that the received wave is in a predetermined arrival direction with respect to the plurality of antennas;

causing the radio wave source to generate the received wave;

receiving the received wave by the antennas; and acquiring the intensity difference table in which an intensity difference of the received wave between two of the antennas is associated with a received-wave arrival direction.

\* \* \* \* \*